United States Patent
Vangraefschepe et al.

(10) Patent No.: US 7,461,633 B2
(45) Date of Patent: Dec. 9, 2008

(54) METHOD OF CONTROLLING THE COMBUSTION PHASE OF AN INTERNAL-COMBUSTION ENGINE, NOTABLY A GASOLINE TYPE DIRECT-INJECTION SUPERCHARGED ENGINE

(75) Inventors: Franck Vangraefschepe, Rueil-Malmaison (FR); Jean-Marc Zaccardi, Seynod (FR)

(73) Assignee: IFP, Rueil Malmasion Cedex (FR)

( * ) Notice: Subject to any disclaimer, the term of this patent is extended or adjusted under 35 U.S.C. 154(b) by 101 days.

(21) Appl. No.: 11/679,244

(22) Filed: Feb. 27, 2007

(65) Prior Publication Data
US 2008/0035129 A1   Feb. 14, 2008

(30) Foreign Application Priority Data
Feb. 28, 2006   (FR)   .................. 06 01785

(51) Int. Cl.
  *F02M 1/00*   (2006.01)
  *B60T 7/12*   (2006.01)
(52) U.S. Cl. .................. 123/434; 123/435; 123/585; 701/103
(58) Field of Classification Search .......... 123/434, 123/435, 585, 673; 701/103, 104
  See application file for complete search history.

(56) References Cited

U.S. PATENT DOCUMENTS

| | | | |
|---|---|---|---|
| 3,393,557 A | 7/1968 | Brown et al. | |
| 4,646,697 A * | 3/1987 | Grob et al. | 123/406.23 |
| 5,063,901 A * | 11/1991 | Kaneyasu et al. | 123/406.13 |
| 5,148,776 A | 9/1992 | Connor | |
| 5,864,055 A * | 1/1999 | Borrione et al. | 73/35.09 |
| 6,522,024 B1 * | 2/2003 | Takaoka et al. | 290/40 C |
| 6,848,427 B2 * | 2/2005 | Song et al. | 123/486 |
| 2005/0056254 A1 | 3/2005 | Wozniak et al. | |
| 2008/0033627 A1 * | 2/2008 | Tanaka | 701/102 |

FOREIGN PATENT DOCUMENTS

| | | |
|---|---|---|
| DE | 198 59 310 A1 | 6/2000 |
| EP | 1 526 265 A2 | 4/2005 |
| EP | 1 586 757 A1 | 10/2005 |
| GB | 2 244 514 A | 12/1991 |
| WO | WO 03/042521 A2 | 5/2003 |

* cited by examiner

*Primary Examiner*—John T Kwon
(74) *Attorney, Agent, or Firm*—Antonelli, Terry, Stout & Kraus, LLP.

(57) ABSTRACT

Method of controlling the combustion of an internal-combustion engine, in particular a direct-injection supercharged engine, notably of gasoline type, wherein the engine comprises at least one cylinder (12) with a combustion chamber (14) within which a compression stage takes place, followed by a stage of combustion of a fuel mixture by a spark-ignition means (34), characterized in that it consists in measuring a quantity related to at least one parameter representative of the state of the fuel mixture during said stages; in determining a value that depends on the amplitude of the measured quantity; in comparing the determined value with at least one threshold value representative of the quantity related to said parameter representative of the conventional state of the fuel mixture during said stages; in detecting the start of an abnormal combustion when the determined value exceeds said threshold value and when the ignition means is not actuated; in controlling the course of the abnormal combustion detected in the combustion chamber.

12 Claims, 1 Drawing Sheet

METHOD OF CONTROLLING THE COMBUSTION PHASE OF AN INTERNAL-COMBUSTION ENGINE, NOTABLY A GASOLINE TYPE DIRECT-INJECTION SUPERCHARGED ENGINE

FIELD OF THE INVENTION

The present invention relates to a method of controlling the combustion phase of an internal-combustion engine.

It more particularly relates to a method intended for a spark-ignition engine, preferably of gasoline type, and notably an advantageously direct-injection supercharged engine.

BACKGROUND OF THE INVENTION

This type of engine includes at least one cylinder comprising a combustion chamber delimited by the inner lateral wall of the cylinder, by the top of the piston that slides in this cylinder and by the cylinder head. Generally, a fuel mixture is contained in this combustion chamber and it undergoes a compression stage, then a combustion stage under the effect of a spark ignition, such as a spark plug, these stages being grouped together under the term "combustion stage" in the description hereafter.

It has been observed that this fuel mixture can undergo various combustion types and that these combustion types are the source of different pressure levels and of mechanical and/or thermal stresses some of which can seriously damage the engine.

The first combustion, referred to as conventional combustion or normal combustion, is the result of the propagation of the combustion of a fuel mixture compressed during a previous engine compression stage. This combustion normally propagates in a flame front from the spark generated at the plug and there is no risk it may damage the engine.

Another combustion type is a knocking combustion resulting from an unwanted self-ignition in the combustion chamber. Thus, after the fuel mixture compression stage, the plug is actuated so as to allow ignition of this fuel mixture. Under the effect of the pressure generated by the piston and of the heat released by the fuel mixture combustion start, a sudden and localized self-ignition of part of the compressed fuel mixture occurs before the flame front resulting from the ignition of the fuel mixture by the spark plug comes near. This mechanism, referred to as engine knock, leads to a local pressure increase and it can generate, in case it occurs repeatedly, destructive effects on the engine and mainly at the piston.

Finally, another combustion type is an abnormal combustion due to a pre-ignition of the fuel mixture before the spark plug initiates ignition of the fuel mixture present in the combustion chamber.

This abnormal combustion mainly affects engines that are the result of a downsizing operation. This operation is intended to reduce the size and/or the capacity of the engine while keeping the same power and/or the same torque as conventional engines. Generally, this type of engine is essentially of gasoline type and it is highly supercharged.

It has been observed that this abnormal combustion occurs at high loads and generally at low engine speeds, when timing of the fuel mixture combustion cannot be optimum because of engine knock. Considering the high pressures and the high temperatures reached in the combustion chamber as a result of supercharging, an abnormal combustion can start sporadically or continuously well before ignition of the fuel mixture by the spark plug takes place. This combustion is characterized by a first flame propagation phase that occurs too soon in relation to that of a conventional combustion. This propagation phase can be interrupted by a self-ignition involving a large part of the fuel mixture present in the combustion chamber.

If this abnormal combustion takes place repeatedly from engine cycle to engine cycle and starts from a hot spot of the cylinder for example, it is referred to as "pre-ignition". If this combustion occurs suddenly, in a random and sporadic way, it is referred to as "rumble".

The latter abnormal combustion leads to very high pressure levels (120 to 250 bars) and to a thermal transfer increase that may cause partial or total destruction of the moving elements of the engine, such as the piston or the piston rod.

The present invention therefore aims to identify the start of an abnormal combustion, of "pre-ignition" as well as of "rumble" type, with the devices and systems commonly used in engines. After identification, the invention is aimed to take the steps allowing to prevent this abnormal combustion from developing sufficiently in the engine cycle to have destructive consequences thereon.

SUMMARY OF THE INVENTION

The present invention thus relates to a method of controlling the combustion of an internal-combustion engine, in particular a direct-injection supercharged engine, notably of gasoline type, wherein the engine includes at least one cylinder with a fuel supply means and an intake means with an intake valve, as well as an exhaust means with an exhaust valve, said cylinder comprising a combustion chamber within which takes place a compression stage, followed by a stage of combustion of a fuel mixture by a spark-ignition means, characterized in that it consists in:

- measuring a quantity related to at least one parameter representative of the state of the fuel mixture during said stages,
- determining a value that depends on the amplitude of the measured quantity,
- comparing the determined value with at least one threshold value representative of the quantity related to said parameter representative of the conventional state of the fuel mixture during said stages,
- detecting the start of an abnormal combustion when the determined value exceeds said threshold value and when the ignition means is not actuated,
- controlling the course of the abnormal combustion detected in the combustion chamber.

This method can consist in controlling the abnormal combustion at a crank angle ranging between 5° and 10° after the crank angle at which the start of the abnormal combustion was detected.

It can also consist in feeding into the combustion chamber an agent intended to control the abnormal combustion.

This agent can contain fuel and/or water and/or carbon dioxide.

The method can also consist in decreasing the pressure in the combustion chamber to control the abnormal combustion.

It can consist in opening at least one additional valve so as to reduce the pressure within the combustion chamber.

It can also consist in opening at least one of the valves so as to reduce the pressure within the combustion chamber.

The quantity can correspond to the pressure of the fuel mixture in the combustion chamber.

The quantity can correspond to the ionization current of the fuel mixture in the combustion chamber.

The quantity can correspond to the vibrations generated by the fuel mixture in the combustion chamber.

BRIEF DESCRIPTION OF THE FIGURES

Other features and advantages of the invention will be clear from reading the description hereafter, with reference to the accompanying figures wherein.

DETAILED DESCRIPTION

Figure 1:
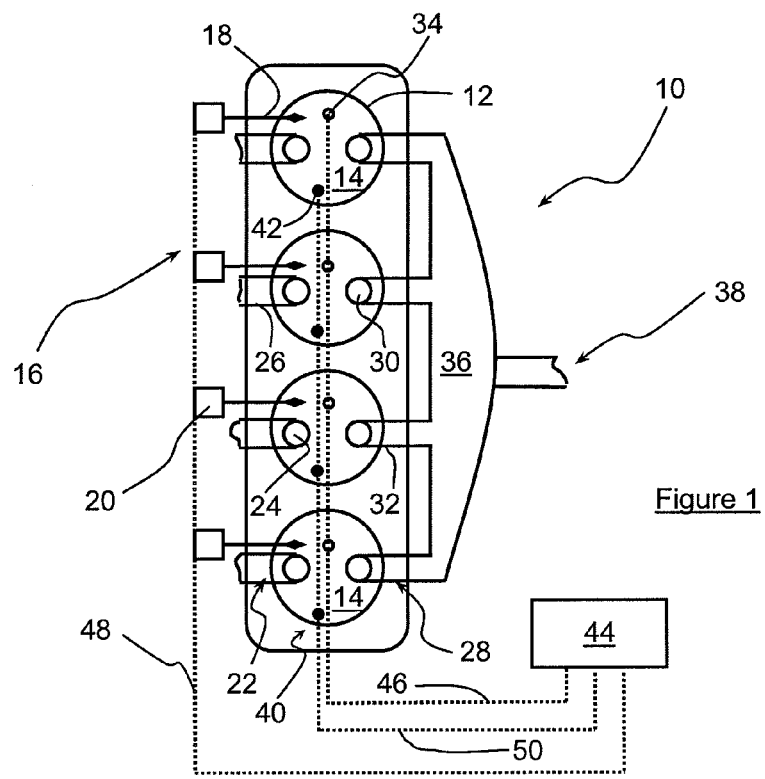
FIG. 1 shows an engine using the combustion phase control method according to the invention.

FIG. 1 shows an example of a gasoline type spark-ignition supercharged internal-combustion engine 10. Of course, any other type of spark-ignition engine, such as an engine running on gas, VNG or LPG for example, can also be used. This engine comprises at least one cylinder 12 with a combustion chamber 14 generally delimited by the inner wall of the cylinder, the part of the cylinder head opposite the piston and the top of the piston. It is in this chamber that combustion of a mixture of air, preferably supercharged, and of fuel, gasoline here, occurs among other things.

The cylinder comprises at least one means 16 for delivering fuel under pressure, for example in form of a fuel injection nozzle 18 that opens into the combustion chamber and is controlled by a valve 20. This cylinder also comprises at least one air supply means 22 with a valve 24 associated with an intake pipe 26, at least one burnt gas exhaust means 28 with a valve 30 and an exhaust pipe 32, and at least one ignition means 34 such as a spark plug, that allows to generate one or more sparks allowing the fuel mixture present in the combustion chamber to be ignited.

Pipes 32 of exhaust means 28 of this engine are connected to an exhaust manifold 36 itself connected to an exhaust line 38. A supercharging device (not shown) such as a turbocharger or a positive-displacement compressor allows an intake air under pressure (or supercharged air) to be fed into combustion chambers 14 through intake pipes 26.

The engine comprises means 40 for measuring at least one quantity related to the combustion phase (compression stage followed by a combustion stage) of the fuel mixture in combustion chamber 14. More particularly, it comprises means for measuring at least one quantity related to a parameter representative of the state of the fuel mixture during said stages.

More precisely, the parameter representative of the state of the fuel mixture considered in the description hereafter is the parameter of the internal pressure of the cylinder. Thus, in the example illustrated in FIG. 1, these means include a pressure detector 42 that is arranged opposite the combustion chamber and that allows to measure the evolution of the pressure prevailing in this chamber.

Of course, any other means can be used without departing from the scope of the invention, such as ionization probes that generate a signal representative of the ionization current of the fuel mixture during combustion, or optical detectors. By way of example, these means can also comprise knock detection means usually arranged on the cylinder casing of the engine, such as an accelerometer that allows a signal representative of vibrational waves to be generated.

As it is well known, the engine comprises a computing and control unit 44 referred to as engine computer, which allows to control running of this engine. More particularly, this engine computer is directly or indirectly connected by conductors to the various detectors, probes and/or detection means the engine is equipped with so as to be able to receive the signals emitted thereby, such as the temperature of the water, the temperature of the oil or the pressure in the combustion chamber. These signals are processed by computation, then the unit controls, through control lines, the components of this engine so as to ensure smooth running thereof.

Thus, in the case of the example shown in FIG. 1, spark plugs 34 are connected by control lines 46 to the engine computer so as to control the ignition time of the fuel mixture, and valves 20 controlling injection nozzles 18 are connected by control lines 48 to computer 44 so as to control the parameters of the fuel injection into the combustion chambers, such as the amount of fuel injected or the injection time. Pressure detectors 42 are connected by a conductor 50 to this computer in order to send thereto the signals representative of the pressure prevailing in the combustion chambers.

This engine computer also comprises mappings or data charts allowing to evaluate the parameters necessary for its operation according to the different running conditions of the engine, such as the engine speed or the power required by the driver. Thus, some of these mappings list, according to these various running conditions, the evolution of quantities related to at least one parameter representative of the state of the fuel mixture during the combustion phase, such as the quantity related to the pressure prevailing in the cylinder, more commonly referred to as cylinder pressure.

Figure 2:
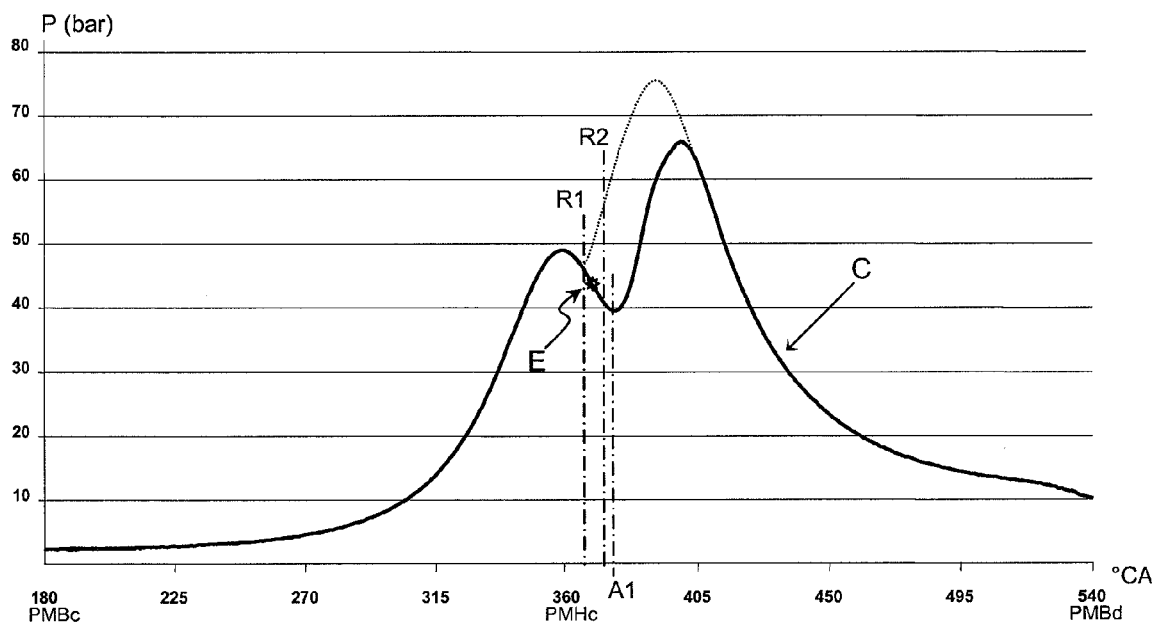
FIG. 2 shows pressure curves for a conventional combustion phase and for an abnormal combustion.

As it is more visible in FIG. 2, curve C (continuous line) shows the conventional evolution of the pressure (in bar) in the combustion chamber, by way of non limitative example only, according to the crank angle (in ° C.A) during a conventional combustion phase.

During this conventional combustion phase, the piston compresses the fuel mixture present in the combustion chamber between the compression Bottom Dead Center (PMBc at about 180° C.A) and the neighbourhood of the compression Top Dead Center (PMHc at about 360° C.A). In the neighbourhood of the top dead center PMH (at more or less some degrees in relation to PMH), a spark E is generated at the plug so as to initiate combustion. This combustion initiation is translated into an increase in cylinder pressure P, as can be seen at ° C.A (point µl). The heat released by this combustion is converted to work during the combustion stage up to the expansion Bottom Dead Center PMBd, where the pressure in the combustion chamber is close to the atmospheric pressure.

In order to control any abnormal combustion occurring in the combustion chamber, the means for measuring the pressure within combustion chambers 14, here pressure detectors 42, measure the pressure of the fuel mixture in these chambers during the combustion phase contained between PMBc and PMBd (compression stage followed by a combustion stage). This pressure information is sent through line 50 to engine computer 44. The computer determines, generally by computation, a value that depends on the amplitude of the measured pressure. By way of example only, this computer uses the pressure signal according to the crank angle associated with the cylinder volume law. More precisely, the value is determined by a computation that takes account of the pressure and the volume derivative associated with the volume and the pressure derivative, which allows to know the energy release of the fuel mixture contained in the combustion chamber. This value is then compared with a threshold value that is representative of the evolution of at least one parameter representative of the state of the fuel mixture for a conventional combustion phase. This threshold value is advantageously contained in the data charts of the computer. Similarly, this threshold value is previously computed and stored in the charts by taking account of the pressure signal according to the crank angle associated with the cylinder volume law. This allows the engine computer to detect the start of an abnormal combustion of "rumble" or "pre-ignition" type in the combustion chamber, on the one hand, when the value determined exceeds the threshold value, which shows the existence of a combustion and, on the other hand, when this exceeding occurs early in the cycle, i.e. before a spark is produced at the plug. Thus, an abnormal combustion is detected where there is a combustion and when this combustion takes place before ignition of the fuel mixture by the spark plug.

As shown by the curve in dotted line in FIG. 2 that illustrates the course of an abnormal combustion and control thereof, there is, between initiation of the combustion of the fuel mixture and its self-ignition, a flame propagation phase of some degrees, between 5° and 10° C.A, as shown by R1 and R2 in the figure. During this interval, the computer can detect the start of the combustion and its early presence in relation to the production of the spark. In case of an abnormal combustion, this computer then initiates the actions required for control of this combustion while preventing such a combustion from continuing.

What is referred to as abnormal combustion control is not only the possibility of controlling the course of this combustion in order to prevent sudden destructive pressure increases, but also of completely stopping such a combustion, by smothering for example.

Preferably, this combustion control is achieved by fuel re-injection at crank angle R2 through nozzles 18. More precisely, the computer controls valves 20 in such a way that the injection nozzle of the cylinder concerned allows an amount of fuel to be fed into the combustion chamber in liquid form. The amount of re-injected fuel depends on the engine design and it can range from 10% to 200% of the amount of fuel initially fed into this combustion chamber. The re-injected fuel is thus used for impeding the flame that starts spreading in case of abnormal combustion. This re-injection allows to either blow out the flame or to smother it by increasing the fuel/air ratio of the fuel mixture. Furthermore, the fuel injected in liquid form uses the heat present around this flame to vaporize and the temperature conditions around the flame will decrease and delay the combustion of the fuel mixture, notably its self-ignition.

After this fuel injection, the pressure in the cylinder increases but less suddenly. The pressure then decreases until it joins curve C and reaches a level compatible with the pressure level of a conventional combustion.

Any development of an abnormal combustion with a high combustion velocity and high pressures is thus prevented.

Of course, the means for controlling the abnormal combustion will be used for each cycle during which such a combustion is detected by the computer.

The actions of the method as described above can be combined with other, slower actions such as closure of the throttle blade to prevent the pressure conditions in the combustion chamber from promoting an abnormal combustion during the next cycles.

The present invention is not limited to the examples described above and it encompasses any variant and equivalent.

Notably, without departing from the scope of the invention, other agents intended to stop an abnormal combustion can be fed into the combustion chamber. Thus, these agents can be water in vapour or liquid form, or carbon dioxide. In this case, the engine comprises specific additional nozzles for introduction of these agents in association with a dedicated circuit (pump, tank, . . . ).

It can also be possible to control the abnormal combustion by lowering the internal pressure of the combustion chamber by means of a pressure relief by opening a pressure-relief valve. This valve can be either an additional valve or intake valve 24 and/or exhaust valve 30.

Furthermore, the present invention can also relate to an indirect-injection spark-ignition engine. In this case, the course of an abnormal combustion will be controlled by means of a specific nozzle (fuel, water, $CO_2$), as mentioned above, or by valve opening.

The invention claimed is:

1. A method of controlling the combustion of an internal-combustion engine, in particular a direct-injection supercharged engine, notably of gasoline type, wherein the engine includes at least one cylinder with a fuel supply means and an intake means with an intake valve as well as an exhaust means with an exhaust valve, said cylinder comprising a combustion chamber within which takes place a compression stage, followed by a stage of combustion of a fuel mixture by a spark-ignition means, characterized in that it consists in:

measuring a quantity related to at least one parameter representative of the state of the fuel mixture during said stages, determining a value that depends on the amplitude of the measured quantity, comparing the determined value with at least one threshold value representative of the quantity related to said parameter representative of the conventional state of the fuel mixture during said stages, detecting the start of an abnormal combustion when the determined value exceeds said threshold value and when the ignition means is not actuated, controlling the course of the abnormal combustion detected in the combustion chamber.

2. A combustion control method as claimed in claim 1, characterized in that it consists in controlling the abnormal combustion at a crank angle (R2) ranging between 5° and 10° after crank angle (R1) where the abnormal combustion start was detected.

3. A combustion control method as claimed in claim 1, characterized in that it consists in feeding an agent intended to control the abnormal combustion into the combustion chamber.

4. A combustion control method as claimed in claim 3, characterized in that it consists in feeding an agent containing fuel into the combustion chamber to control the combustion.

5. A combustion control method as claimed in claim 3, characterized in that it consists in feeding an agent containing water into combustion chamber to control the combustion.

6. A combustion control method as claimed in claim 3, characterized in that it consists in feeding an agent containing carbon dioxide into combustion chamber to control the combustion.

7. A combustion control method as claimed in claim 1, characterized in that it consists in decreasing the pressure within combustion chamber to control the abnormal combustion.

8. A combustion control method as claimed in claim 7, characterized in that it consists in opening at least one additional valve in order to decrease the pressure within combustion chamber.

9. A combustion control method as claimed in claim 7, characterized in that it consists in opening at least one of valves in order to decrease the pressure within combustion chamber.

10. A combustion control method as claimed in claim 1, characterized in that the quantity corresponds to the pressure of the fuel mixture in the combustion chamber.

11. A combustion control method as claimed in claim 1, characterized in that the quantity corresponds to the ionization current of the fuel mixture in the combustion chamber.

12. A combustion control method as claimed in claim 1, characterized in that the quantity corresponds to the vibrations generated by the fuel mixture in the combustion chamber.

* * * * *